United States Patent
Dubrovsky et al.

(10) Patent No.: US 12,499,173 B2
(45) Date of Patent: Dec. 16, 2025

(54) METHODS AND SYSTEMS FOR OPTICAL MATRIX CALCULATION

(71) Applicant: SiPhox, Inc., Burlington, MA (US)

(72) Inventors: Michael Dubrovsky, Somerville, MA (US); Diedrik Rene Vermeulen, Somerville, MA (US)

(73) Assignee: SiPhox, Inc., Burlington, MA (US)

( * ) Notice: Subject to any disclaimer, the term of this patent is extended or adjusted under 35 U.S.C. 154(b) by 1119 days.

(21) Appl. No.: 17/338,381

(22) Filed: Jun. 3, 2021

(65) Prior Publication Data

US 2021/0382515 A1    Dec. 9, 2021

Related U.S. Application Data

(60) Provisional application No. 63/034,225, filed on Jun. 3, 2020.

(51) Int. Cl.
| | |
|---|---|
| *G06F 17/16* | (2006.01) |
| *G06E 1/04* | (2006.01) |
| *G06E 3/00* | (2006.01) |
| *G02F 1/21* | (2006.01) |

(52) U.S. Cl.
CPC ............ *G06F 17/16* (2013.01); *G06E 1/045* (2013.01); *G06E 3/008* (2013.01); *G02F 1/212* (2021.01)

(58) Field of Classification Search
CPC ........... G06E 1/045; G02F 1/212; G02F 3/00; G06N 10/00; G06N 3/067; G06N 3/0675; G06F 17/16; G06G 7/16

See application file for complete search history.

(56) References Cited

U.S. PATENT DOCUMENTS

| | | |
|---|---|---|
| 8,027,587 B1 | 9/2011 | Watts |
| 10,009,135 B2 | 6/2018 | Tait |
| 10,740,693 B2 | 8/2020 | Lazovich |
| | (Continued) | |

FOREIGN PATENT DOCUMENTS

| | | |
|---|---|---|
| WO | 2020102204 A1 | 5/2020 |
| WO | 2020180351 A1 | 9/2020 |

OTHER PUBLICATIONS

Dubrovsky et al., in "Optical Proof of Work", Feb. 2020, https://arxiv.org/abs/1911.05193 (Year: 2020).*

(Continued)

*Primary Examiner* — Carlo Waje
(74) *Attorney, Agent, or Firm* — Caldwell Intellectual Property Law

(57) ABSTRACT

Aspects relate to methods and systems for optical matrix calculation. An exemplary system includes at least a first light source configured to output at least a first optical output having a first wavelength, at least a second light source configured to output at least a second optical output having a second wavelength substantially different from the first wavelength, at least an optical modulator configured to modulate the at least a first optical output, at least an optical matrix multiplier configured to perform at least two matrix multiplications, a first matrix multiplication as a function of the first optical output and a second matrix multiplication as a function of the second optical output, and at least a photodetector configured to measure the at least a first optical output and the at least a second optical output.

16 Claims, 8 Drawing Sheets

(56) References Cited

U.S. PATENT DOCUMENTS

| | | |
|---|---|---|
| 10,768,659 B2 | 9/2020 | Carolan |
| 2005/0018295 A1 | 1/2005 | Mendlovic |
| 2019/0370652 A1 | 12/2019 | Shen |
| 2020/0142441 A1 | 5/2020 | Bunandar |
| 2021/0011312 A1 | 1/2021 | Nahmias |
| 2021/0036783 A1 | 2/2021 | Bunandar |

OTHER PUBLICATIONS

Pezzaniti et al., "Angular dependence of polarizing beam-splitter cubes" in Applied Optics vol. 33, Issue 10, pp. 1916-1929 (1994) https://doi.org/10.1364/AO.33.001916 (Year: 1994).*
Title: Matrix processing with nanophotonics By: Martin Forsythe Date Aug. 28, 2019.
Title: Photonics for artificial intelligence and neuromorphic computing By: Bhavin J. Shastria Date: Dec. 1, 2020.
Title: Meshing optics with applications By: David A B Miller Date: Jul. 1, 2017.
Title: Silicon Photonics Codesign for Deep Learning By: Qixiang Cheng Date: Jan. 1, 2020.
Title: Principles of Neuromorphic Photonics By: Bhavin J. Shastria Date: Dec. 29, 2017.
Title: Silicon Optical Matrix Processor for Parallel Computing By: Lin Yang Date: Aug. 8, 2016.
Title: Primer on silicon neuromorphic photonic processors: architecture and compiler By: Thomas Ferreira De Lima Date: Aug. 10, 2020.

* cited by examiner

METHODS AND SYSTEMS FOR OPTICAL MATRIX CALCULATION

CROSS-REFERENCE TO RELATED APPLICATIONS

This application claims the benefit of priority of U.S. Provisional Patent Application Ser. No. 63/034,225, filed on Jun. 3, 2020, and titled "Optical Computing for Proofs of Work and Other Computing Applications," which is incorporated by reference herein in its entirety.

FIELD OF THE INVENTION

The present invention generally relates to the field of optics and optical computing. In particular, the present invention is directed to methods and systems for optical matrix calculation.

BACKGROUND

Presently cryptocurrencies, such as bitcoin, are gaining in popularity and value. Many cryptocurrencies require computing expense such as proof of work to be used to prove authenticity of a trustless ledger as well as issue new currency. As cryptocurrencies gain in popularity, usage, and value, these required computing expenses, such as electric power consumption, are running up against limits of computational speed and power consumption.

SUMMARY OF THE DISCLOSURE

In an aspect, a system for optical calculation with asynchronous feedback includes at least a first light source configured to output at least a first optical output having a first wavelength, at least an optical modulator located down beam from the at least a first light source and configured to modulate the at least a first optical output, at least an optical matrix multiplier located down beam from the at least an optical modulator configured to accept the at least a first optical output and generate a first matrix multiplication output as a function of the at least a first optical output, at least a first photodetector located down beam from the at least an optical matrix multiplier configured to measure the first matrix multiplication output and generate a first electrical multiplication output signal as a function of the first matrix multiplication output, and an asynchronous feedback circuit electrically connected to the at least a photodetector and at least one of the at least an optical modulator and the at least an optical matrix multiplier, wherein the asynchronous feedback circuit is configured to calculate a first feedback signal as a function of the first multiplication output signal and provide the first feedback signal to the at least one of the at least an optical modulator and the at least a matrix multiplier.

In another aspect, a method of optical calculation with asynchronous feedback includes outputting, using at least a first light source, at least a first optical output having a first wavelength, modulating, using at least an optical modulator located down beam from the at least a first light source, the at least a first optical output, generating, using at least an optical matrix multiplier located down beam from the at least an optical modulator, a first matrix multiplication output as a function of the at least a first optical output, generating, using at least a first photodetector located down beam from the at least an optical matrix multiplier, a first electrical multiplication output signal as a function of the first matrix multiplication output, calculating, by an asynchronous feedback circuit electrically connected to the at least a photodetector and at least one of the at least an optical modulator and the at least an optical matrix multiplier, a first feedback signal as a function of the first multiplication output signal, and providing, by the asynchronous feedback circuit, the first feedback signal to the at least one of the at least an optical modulator and the at least a matrix multiplier.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for optical matrix calculations. In an embodiment, light having different wavelengths may be used to perform simultaneous (e.g., parallel) matrix calculations.

Aspects of the present disclosure can be used to evaluate cryptographic hash functions, for example as may be required with a cryptocurrency. Aspects of the present disclosure can also be used to reduce variable computing expenses, for example those associated with electricity consumption, during Proof of Work calculations. This is so, at least in part, because optical matrix calculation may be performed with minimal electrical consumption at rates orders of magnitude greater than digital matrix calculations.

Aspects of the present disclosure allow for multiplexing of wavelengths for simultaneous or parallel calculation using common optical systems, such as photonic integrated chips. In some cases, simultaneous use of multiple wavelengths within a single photonic integrated circuit may achieve added security. For example, optical path lengths within a photonic integrated circuit may vary according to wavelength. This phenomenon is widely understood in optics fields as chromatic aberration. Therefore, in some cases, performance of a single photonic integrated circuit may be wavelength dependent; and this wavelength dependency may not be easily determined outside of operation of the photonic integrated circuit. Exemplary embodiments illustrating aspects of the present disclosure are described below in the context of several specific examples.

Figure 1:
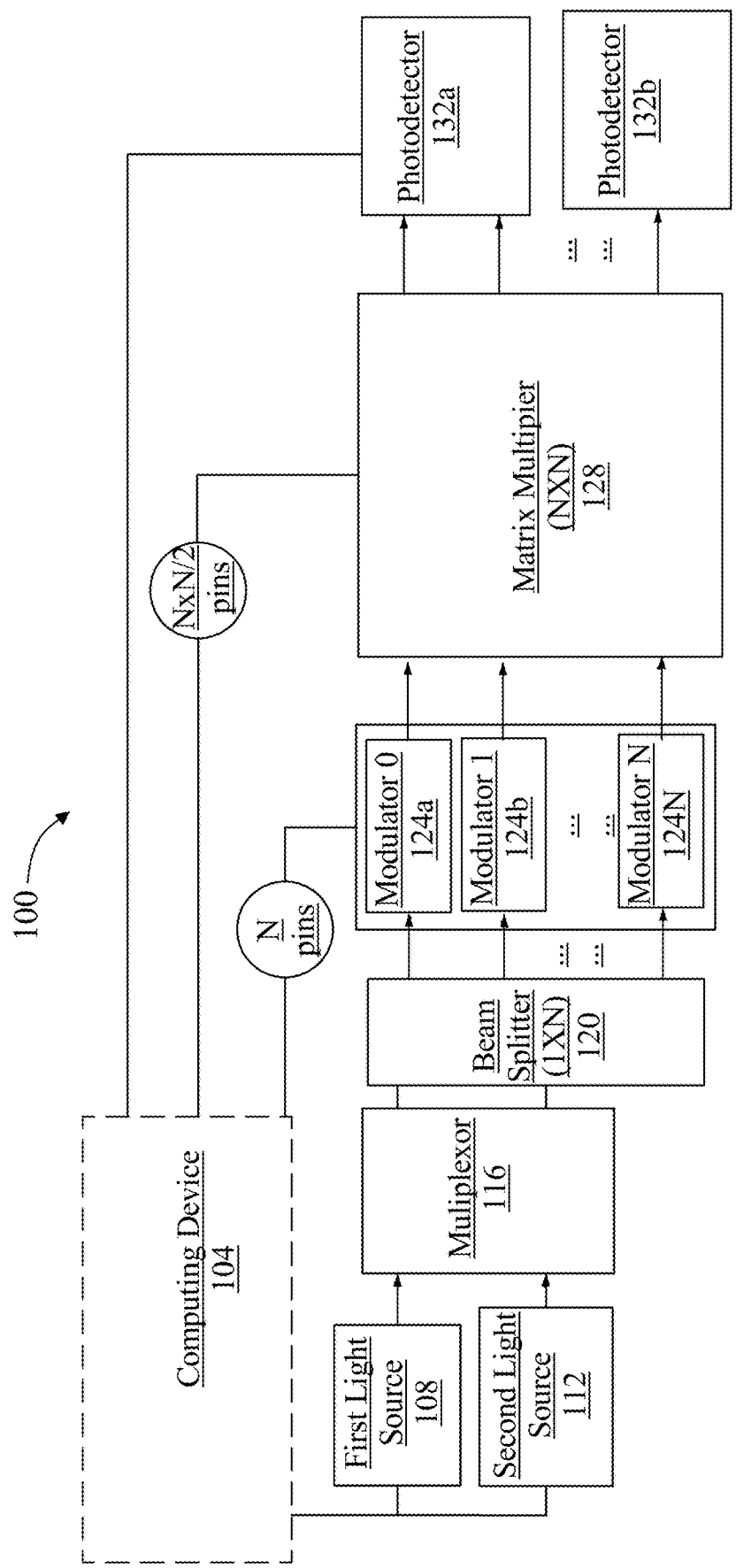
FIG. 1 is a block diagram illustrating an exemplary system for optical matrix calculation.

Referring now to FIG. 1, an exemplary embodiment of a system 100 for optical matrix calculation is illustrated. System may include a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes first light source 108. System may include a plurality of light sources; for instance, system may include at least a second light source 112. As used in this disclosure, a "light source" is any device configured to emit light. In some cases a light source may include a coherent light source, which is configured to emit coherent light, for example a laser. In some cases, a light source may include a non-coherent light source configured to emit non-coherent light, for example a light emitting diode (LED). In some cases, light source may emit a light having substantially one wavelength. In some cases, light source may emit a light having a wavelength range. Light may have a wavelength in an ultraviolet range, a visible range, a near-infrared range, a mid-infrared range, and/or a far-infrared range. For example, in some cases light may have a wavelength within a range from about 100 nm to about 20 micronmeters. In some cases, light may have a wavelength within a range of about 400 nm to about 2,500 nm. Light sources may include, one or more diode lasers, which may be fabricated, without limitation, as an element of an integrated circuit; diode lasers may include, without limitation, a Fabry Perot cavity laser, which may have multiple modes permitting outputting light of multiple wavelengths, a quantum dot and/or quantum well-based Fabry Perot cavity laser, an external cavity laser, a mode-locked laser such as a gain-absorber system, configured to output light of multiple wavelengths, a distributed feedback (DFB) laser, a distributed Bragg reflector (DBR) laser, an optical frequency comb, and/or a vertical cavity surface emitting laser. Light source may additionally or alternatively include a light-emitting diode (LED), an organic LED (OLED) and/or any other light emitter. In some cases, first optical output and second optical output may be combined along a shared optical path.

In some cases, and still referring to FIG. 1, first optical output and second optical output may be combine using a wavelength multiplexor 116. As used in this disclosure, a "wavelength multiplexor" is a device that is configured to combine to wavelengths of light along a shared optical path. In some cases, a wavelength multiplexor may include at least a dichroic beam combiner. In some cases, a wavelength multiplexor may include any of a hot mirror, a cold mirror, a short-pass filter, a long pass filter, a notch filter, and the like. An exemplary wavelength multiplexor may include part No. WDM-11P from OZ Optics of Ottawa, Ontario, Canada. In some cases at least a first light source 108 and/or at least a second light source 112 may include a plurality of light sources, such as without limitation a one-dimensional light source array. Alternatively or additionally, in some embodiments, system 100 may include at least a beam splitter 120. As used in this disclosure, a "beam splitter" is an optic device configured to split light, for example a light beam, into two or more light beams. In some cases a beam splitter may be configured to split light into an array, for example a one-dimensional array of beams. In some cases, beam splitter 120 may include a diffractive optical element (DOE) and each light beam may be associated with a different diffractive order. In some embodiments, beam splitter 120 may include at least a polarizer and light beams may be separated based upon polarization. In some cases, beam splitter may include at least an evanescent wave coupler. As used in this disclosure, an "evanescent wave coupler" is an optical component that couples light between two or more optical waveguides by way of an evanescent wave or evanescent field. In some cases, an evanescent wave coupler may be used as a beam splitter 120 or a beam combiner. In some cases, a distance between waveguides is a design parameter that may be used to determine coupling of an evanescent wave coupler.

With continued reference to FIG. 1, at least a beam splitter 120 in some embodiments may be wavelength dependent. As used in this disclosure, "wavelength dependent" is used to refer to an optical attribute where a given component may function one way on a first wavelength of light, while functioning substantially differently on a second wavelength of light. For example, in some cases, beam splitter 120 may be configured to act only on one of first optical output emitted from first light source 108 and second optical output emitted from second light source 112. In some cases, at least a beam splitter 120 splits first optical output and second optical output into corresponding light arrays, a first optical output array and a second optical output array, respectively. In some cases, at least a beam splitter 120 may include two or more wavelength dependent arrays. In an embodiment, a given optical element may modify an amplitude of light having a first wavelength by a first factor and/or term, such as a first constant factor and/or term, and an amplitude of light having a second wavelength by a second factor and/or term, such as a second constant factor and/or term; first factor and/or term may be different from second factor and/or term, such that a first amplitude corresponding to a first wavelength is multiplied by a first coefficient and/or added to by a first constant term, and a second amplitude corresponding to a second wavelength is multiplied by a second coefficient and/or added to by a second constant term, and the first coefficient and/or first constant term is substantially different from the second coefficient and/or second constant term. A difference between terms and coefficients may be substantial for this purpose where a resulting change in amplitude results in a different mathematical output, as detected and/or computed as described below, as a result of the difference between terms and coefficients; in other words, a measured change in first amplitude, as represented in a computational result represented as a coefficient multiplied by first amplitude and/or a term added to first amplitude, differs from a measured change in second amplitude, as represented in a computational result represented as a coefficient multiplied by second amplitude and/or a term added to second amplitude, such that the coefficients and/or terms as measured and/or computed differ from each other.

With continued reference to FIG. 1, in some embodiments, one or more of first optical output array and second optical output array may be accepted by at least an optical modulator 124. At least an optical modulator 124 may be located down beam from at least a first light source 108 and/or at least a second light source 112. As used in this disclosure, "down beam" and "up beam" refer to a relative position along a light path, i.e., beam. Down beam and up beam are used throughout as analogous to down-stream and up-stream may be used to refer to positions along a river or other flowing body of water. As used in this disclosure, an "optical modulator" is a device that can modulate at least a characteristic of light. For example, an optical modulator may be configured to modulate any of light intensity, light pulse characteristics (e.g., pulsed duration, repetition rate, duty cycle, and the like), light polarization, light mode, and the like. In some cases, optical modulator may be configured to modulate a plurality of lights, for example over an array of light. In some embodiments, at least an optical modulator 124 may include a plurality of optical modulators 124A-N; for instance without limitation plurality of optical modulators 124A-N may be arranged in an array (e.g., one-dimensional array).

In some embodiments, and still referring to FIG. 1, at least an optical modulator 124 may include at least a tunable attenuator. As used in this disclosure, a "tunable attenuator" is an optical device that selectively attenuates a light. For example, in some cases, a tunable attenuator may attenuate a light according to a signal, such as without limitation an attenuation control signal. Non-limiting exemplary tunable attenuators comprise interferometers (e.g., Mach-Zehnder Interferometers) configured to introduce a destructive interference to a light signal according to a selected phase shift, polarization analyzers configured to selectively reject light according to a selected polarization angle, variable neutral density filters, shutters, micro-electro-mechanical mechanisms, and the like. In some cases, tunable attenuator may include a variable optical attenuator. A variable optical attenuator may be configured to reduce an intensity (e.g., power, energy, and the like) of an optical signal. An exemplary tunable attenuator may include Mini MEMS 9-16 Channel Variable Optical Attenuator Array from Agiltron of Waltham, Massachusetts Modulators may include, without limitation, Mach Zehnder modulators, electro-optical modulators, ring or disk modulators or other types of resonant modulators, electro-absorption modulators, Frank-Keldysh modulators, acousto-optical modulators, Stark-effect modulators, magneto-optical modulators, thermos-optical modulators, liquid crystal modulators, quantum-confinement optical modulators, and/or photonic crystal modulators; at least an optical modulator may include any other modulator that may occur to persons skilled in the art upon reviewing the entirety of this disclosure. At least an optical modulator 124 may be wavelength dependent and thereby able to act substantially independently upon one or both of first optical output array and second optical output array. In some cases, at least a modulator 124 may in communication with computing device 104. Computing device 104 may control at least a modulator 124, for example by way of one or more control signals. In some cases, vector and/or matrix values may be input by way of the at least a modulator 124. For example, in some cases, light intensity values along an array of light beams may be representative of a vector and/or matrix.

With continued reference to FIG. 1, in some embodiments, system 100 includes at least an optical matrix multiplier 128 located down beam from at least an optical modulator 124. In some cases, optical matrix multiplier may be configured to accept one or both of first optical output array and second optical output array, for example into a plurality of photonic inputs. As used in this disclosure, an "optical matrix multiplier" is an optical component that is configured to perform matrix calculations using at least an optical signal. In some cases, an optical matrix multiplier may include a plurality of Mach-Zehnder Interferometers (MZIs). In some cases, an optical matrix multiplier may include a plurality of microring resonators (MMRs). In some cases, an optical matrix multiplier may include a silicon photonic chip. For example, optical matrix multiplier may include a photonic integrated chip. In some cases, optical matric multiplier may include a co-processor that is communicative with computing device 104. In some cases, optical matric multiplier may be configured to perform at least one matrix multiplication using one or more of first optical output array and second optical output array. In some cases, optical matrix multiplier 128 and/or one or more elements thereof may be wavelength dependent. In some cases, optical matrix multiplier 128 may be configured to perform at least two matrix multiplications one matrix multiplication using first optical output array and one matrix multiplication using second optical output array. In some cases, optical matrix multiplier 128 may include a plurality of a control inputs. Plurality of control inputs may be configured to adjust individual parameters associated with optical matrix multiplication. Further disclosure, exemplary optical elements and exemplary formations of an exemplary optical matrix multiplier are provided below in reference to FIGS. 3-4. At least an optical matrix multiplier may be configured to generate a first matrix multiplication output as a function of the at least a first optical output. At least an optical matrix multiplier may be configured to generate a second matrix multiplication output as a function of the at least a second optical output.

With continued reference to FIG. 1, in some embodiments, system 100 may include at least a first photodetector 132a located down beam from optical matrix multiplier 128. In some cases, at least a first photodetector 132a and/or at least a second photodetector 132ba may be configured to measure one or more of first optical output and second optical output after passing through optical matrix multiplier 128. As used in this disclosure, a "photodetector" is any device that is sensitive to light and thereby able to detect light. In some cases, a photodetector may include a photodiode, a photoresistor, a photosensor, a photovoltaic chip, and the like. In some cases photodetector may include a Germanium-based photodiode. Light detectors may include, without limitation, Avalanche Photodiodes (APDs), Single Photon Avalanche Diodes (SPADs), Silicon Photomultipliers (SiPMs), Photo-Multiplier Tubes (PMTs), Micro-Channel Plates (MCPs), Micro-Channel Plate Photomultiplier Tubes (MCP-PMTs), Indium gallium arsenide semiconductors (InGaAs), photodiodes, and/or photosensitive or photon-detecting circuit elements, semiconductors and/or transducers. Avalanche Photo Diodes (APDs), as used herein, are diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs provide a built-in stage of gain through avalanche multiplication. When the reverse bias is less than the breakdown voltage, the gain of the APD is approximately linear. For silicon APDs this gain is on the order of 10-100. Material of APD may contribute to gains. Germanium APDs may detect infrared out to a wavelength of 1.7 micrometers. InGaAs may detect infrared out to a wavelength of 1.6 micrometers. Mercury Cadmium Telluride (HgCdTe) may detect infrared out to a wavelength of 14 micrometers. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. At least a first photodetector may be configured to generate a first electrical multiplication output signal as a function of the first matrix multiplication output, where first electrical multiplication signal may include without limitation any voltage and/or current waveform generated in response to detection of first matrix multiplication output.

In an embodiment, system 100 may include at least a second photodetector 132b located down beam from the at least an optical matrix multiplier. At least a second photodetector 132b may be implemented using any device or component suitable for use as at least a first photodetector 132a as described above. At least a second photodetector may be configured to measure second matrix multiplication output and generate a second electrical multiplication output signal as a function of the second matrix multiplication output.

In some cases, at least a first photodetector 132a and/or at least a second photodetector 132b may include a photosensor array, for example without limitation a one-dimensional array. Photosensor array may be configured to detect a product of optical matrix multiplication using one or more of first optical output array and second optical output array.

In some cases, at least a first photodetector 132a and/or at least a second photodetector 132b may be wavelength dependent. For instance, and without limitation, first photodetector 132a and/or second photodetector 132b may have a narrow range of wavelengths to which each of first photodetector 132a and second photodetector 132b are sensitive. As a further non-limiting example, each of first photodetector 132a and second photodetector 132b may be preceded by wavelength-specific optical filters such as bandpass filters and/or filter sets, or the like; in any case, a splitter may divide output from matrix multiplier and provide it to each of first photodetector 132a and second photodetector 132b. Alternatively or additionally, one or more optical elements may divide output from matrix multiplier 128 prior to provision to each of first photodetector 132a and second photodetector 132b, such that each of first photodetector 132a and second photodetector 132b receives a distinct wavelength and/or set of wavelengths. For example without limitation, in some cases a wavelength demultiplexor may be disposed between matrix multiplier 128 and at least a first photodetector 132a and/or at least a second photodetector 132b; and the wavelength demultiplexor may be configured to separate one or more lights or light arrays dependent upon wavelength. As used in this disclosure, a "wavelength demultiplexor" is a device that is configured to separate two or more wavelengths of light from a shared optical path. In some cases, a wavelength demultiplexor may include at least a dichroic beam splitter. In some cases, a wavelength demultiplexor may include any of a hot mirror, a cold mirror, a short-pass filter, a long pass filter, a notch filter, and the like. An exemplary wavelength demultiplexor may include part No. WDM-11P from OZ Optics of Ottawa, Ontario, Canada. Further examples of demultiplexors may include, without limitation, gratings, prisms, and/or any other devices and/or components for separating light by wavelengths that may occur to persons skilled in the art upon reviewing the entirety of this disclosure. In an embodiment, wavelength demultiplexor may be configured to separate the first multiplication output and the second multiplication output, for instance and without limitation to guide first multiplication output to at least a first photodetector 132*a* and second multiplication output to at least a second photodetector 132*b*. Alternatively or additionally, in some embodiments, at least a first photodetector 132*a* and/or at least a second photodetector 132*b* may be configured to detect light having more than one wavelength, for example without limitation first optical output array and second optical output array. In some embodiments, each of first photodetector 132*a* and second photodetector 132*b* is configured to detect all wavelengths of output from matrix multiplier 128, such that each detection represents a sum of all amplitudes determined by matrix multiplier 128; this may be used as an overall measurement of work for purposes of proof of work, and/or to add together multiple matrix multiplications made simultaneously, where addition may be performed as an analog addition. In some cases, at least a photodetector may be communicative with computing device 104, such that product of optical matrix multiplication may be communicated with computing device 104. According to some additional embodiments, at least a first photodetector 132*a* and/or at least a second photodetector 132*b* may provide inputs to an analog circuit, which can be used to control optical matrix multiplication. In an embodiment and as a result detection of multiple wavelengths simultaneously, system 100 may produce multiple parallel matrix multiplications, which may be entirely different from each other, for instance based on wavelength-dependent calculations and/or differences therebetween as described above, which may then be summed at detectors by detection of combined wavelengths; this may result in rapid and efficient proof of work that is agnostic to particular calculation results.

Figure 2:
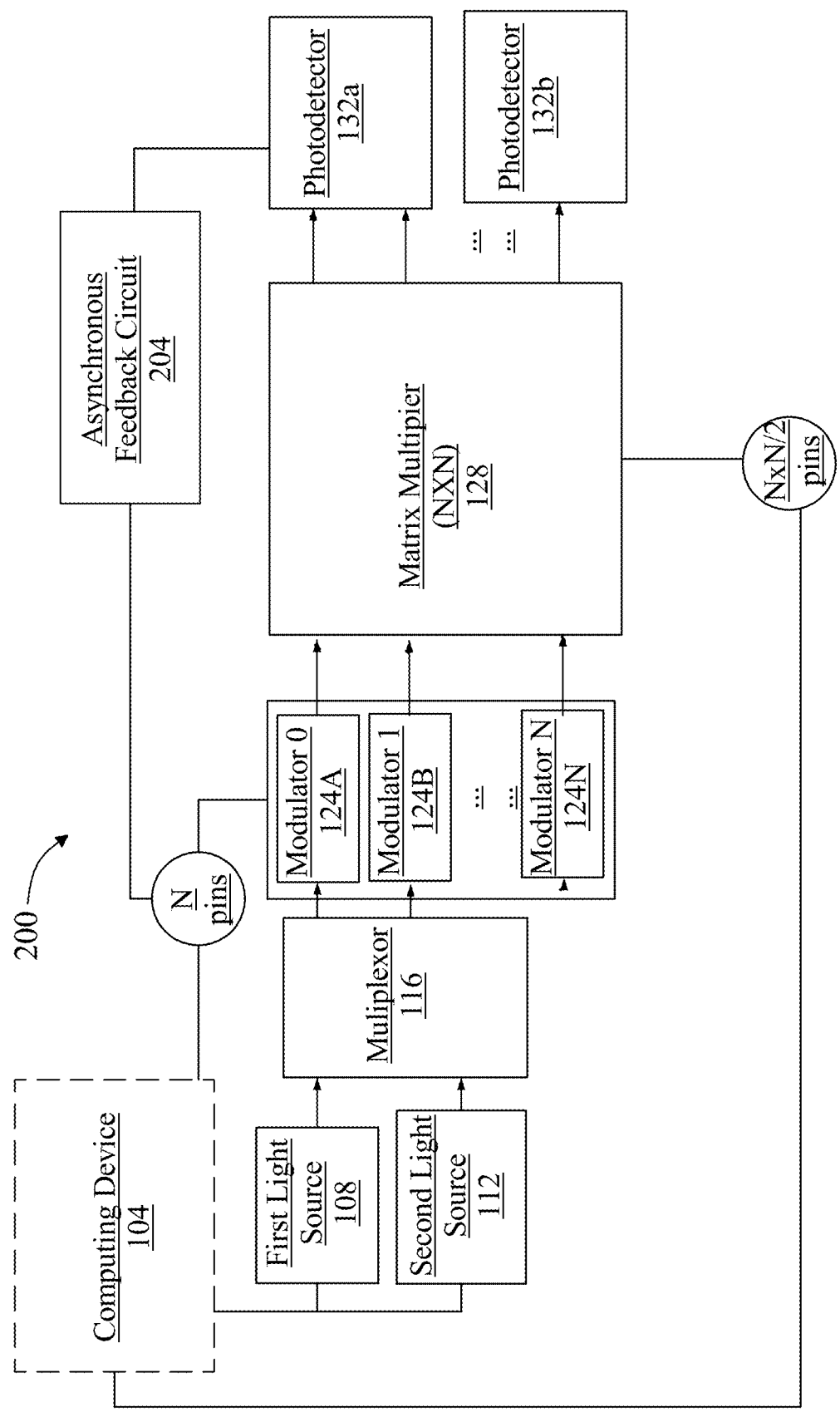
FIG. 2 is a block diagram illustrating another exemplary system for optical matrix calculation.

Referring now to FIG. 2, a system 200 for performing optical matrix mathematics is illustrated with an asynchronous feedback circuit 204. Asynchronous feedback circuit 204 is communicative with at least a first photodetector 132*a* and/or at least a second photodetector 132*b*. In some cases, asynchronous feedback circuit 204 is configured to receive as input at least an electrical signal from at least a first photodetector 132*a* and/or at least a second photodetector 132*b* which is a function of detected light at the at least a first photodetector 132*a* and/or at least a second photodetector 132*b*. Asynchronous feedback circuit may be electrically connected to the at least a photodetector and at least one of the at least an optical modulator and the at least an optical matrix multiplier.

Further referring to FIG. 2, asynchronous feedback circuit 204 may include any analog circuit, including without limitation circuits for signal processing, filtering, and/or amplification. In some cases, asynchronous feedback circuit 204 may include one or more of a transimpedance amplifiers and/or operational amplifiers. In some cases, asynchronous feedback circuit 204 may perform signal processing. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Analog circuits may include, without limitation, operational amplifier-based calculator elements such as integrators, differentiators, multipliers, and the like. Analog circuits may include one or more comparators.

Still referring to FIG. 2, asynchronous feedback circuit may alternatively or additionally include one or more digital logic elements. For instance, and without limitation, comparators comparing one analog value such as a voltage level to another may be configured to output voltages that register has logic "1" or "0" on one or more logic gates, which may be used to drive selection of signals calculated by elements of asynchronous feedback circuit 204, to set downstream voltage levels, or the like. For instance, and without limitation, comparators may be used to compare operands and/or parameters to intervals of values, permitting implementation of a function having values depending on ranges, such as a "step function," a triangular window function, a hyperbolic function, or the like.

With continued reference to FIG. 2, in some embodiments feedback circuit 204 may be in communication with at least a modulator 124. For example, in some cases, asynchronous feedback circuit 204 may modulate a first optical output and/or a second optical output as a function of detected light by at least a first photodetector 132*a* and/or at least a second photodetector 132*b*. As a result, according to some embodiments, asynchronous feedback circuit 204 may be used to iteratively perform matrix multiplications at rates far exceeding that which is presently capable with digital processes, for example a rate of 100 GHz. In some cases, asynchronous feedback circuit 204 may additionally be in communication with at least one of first light source 108 and second light source 112, thereby allowing for analog control of emission of light, as well as modulation of light.

Figure 3:
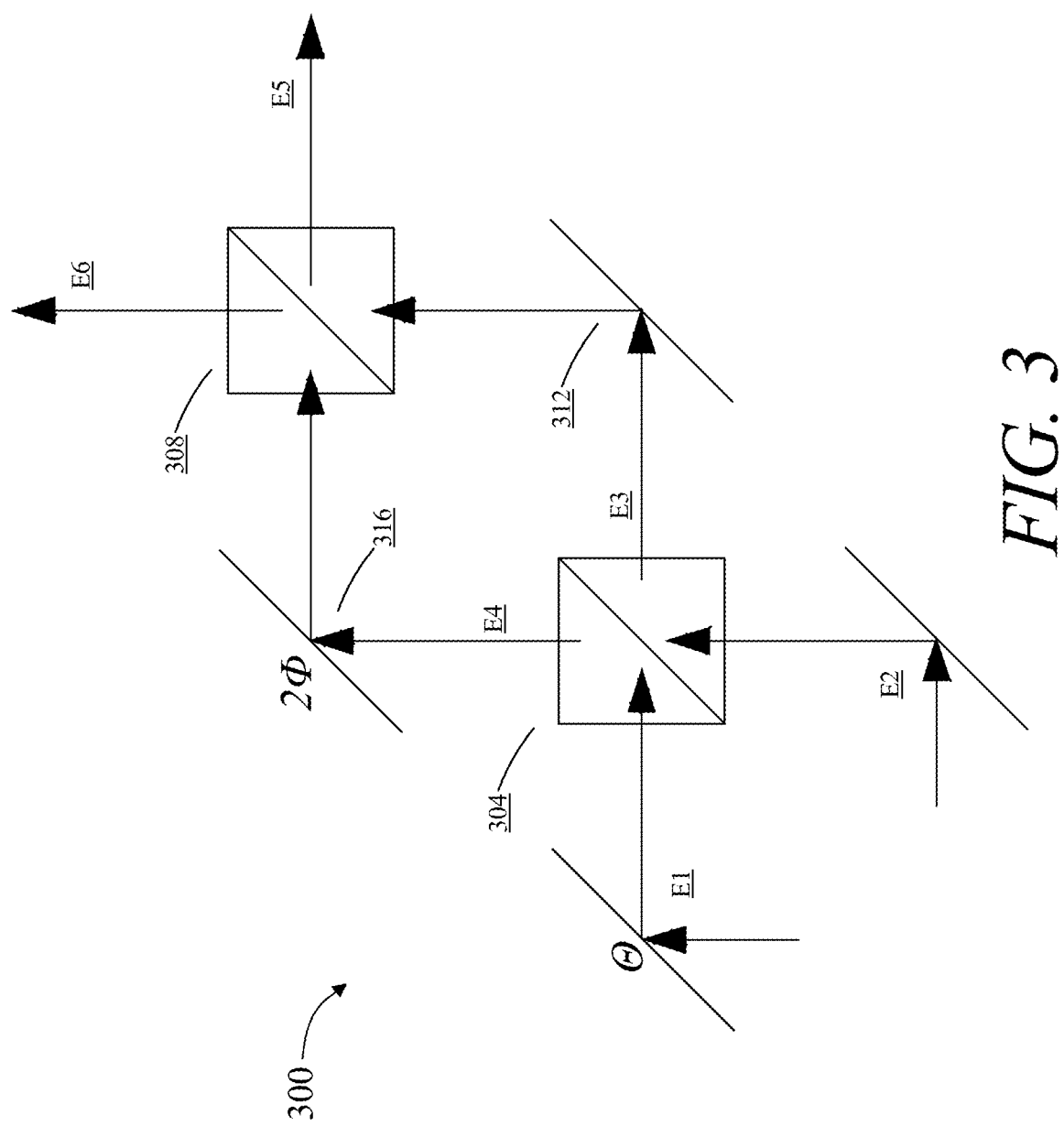
FIG. 3 is a block diagram of an exemplary interferometer.

Referring now to FIG. 3, an exemplary Mach-Zehnder Interferometer (MZI) 300 is illustrated. In some embodiments, a plurality of interferometers, such as without limitation MZIs, may be used as constituent components of an optical matrix multiplier. A MZI 300 may include a first beam splitter 304 configured to accept two input light beams (i.e., spatial modes) E1 and E2 and outputs two internal light beams E3 and E4. A second beam splitter 308 accepts two internal light beams E3 and E4 and outputs two output light beams E5 and E6 from MZI 300. MZI 300 may include a first internal light path 312 and a second internal light path 316. First beam splitter 304 and second beam splitter 308 may include any beam splitter described in this disclosure, including without limitation a dichroic beam splitter, a partially reflective beam splitter, and an evanescent wave coupler. In some cases, a first internal light beam E3 travels along a first internal light path 312 and a second internal light beam E4 travels along a second internal light path 316. In some cases, an optical path length difference between first internal light path 312 and second internal light path 316 may introduce an internal phase shift, $2\Phi$, between E4 and E3. In some cases, internal phase shift may be used to control attenuation of light beams E5 and E6, for example through resulting interference between E3 and E4. In some cases, an external phase shift, $\Theta$, may be introduced substantially outside of (i.e., up beam) from MZI 300. External phase shift may be introduced upon first optical output beam E1 and may result in a shift in phase of components of light within two output light beams E5 and E6. A transfer function representing amplitude probability of MZI 300 may be given thus:

$$\begin{bmatrix} e^{i\theta} \cos(\varphi) & -\sin(\varphi) \\ e^{i\theta} \sin(\varphi) & \cos(\varphi) \end{bmatrix}$$

Given a predictable mathematic representation of an optical system, such as without limitation that provided above representing MZI 300, in some cases, optical functioning of the optical system may be used to "perform" these mathematical operations. Phase shift may be introduced using a phase shift element. As used in this disclosure, a "phase shift element" is an optical element that introduces a change in phase. In some cases, a phase shift element may introduce a change in optical path length to introduce a phase shift. In some cases, phase shift element may introduce a change in index of refraction to introduce a phase shift. For example, in some cases, a thermal actuator may change a temperature of an optical material, thereby changing an index of refraction for light within said optical material. Alternatively or additionally, in some cases, a phase shift element may include a micro-electro-mechanical system (MEMS). For example, an effective index of refraction of a waveguide may be modulated by bringing another material within close proximity of the waveguide. For example, in some exemplary embodiments a silicon oxide bridge may be cantilevered in variable proximity, for example a gap distance of about 250 nm, to a silicon nitride waveguide introducing a phase shift, for example a phase shift as great as about $4\pi$ may be achieved. In some embodiments, MZI 300 may be used to perform scalar multiplication, scalar addition, and/or matrix-vector multiplication, for example without limitation multiplication of 2×2 unitary matrices. In some cases, a plurality of MZIs 300 may be used to perform an arbitrary matrix calculation optically.

Figure 4:
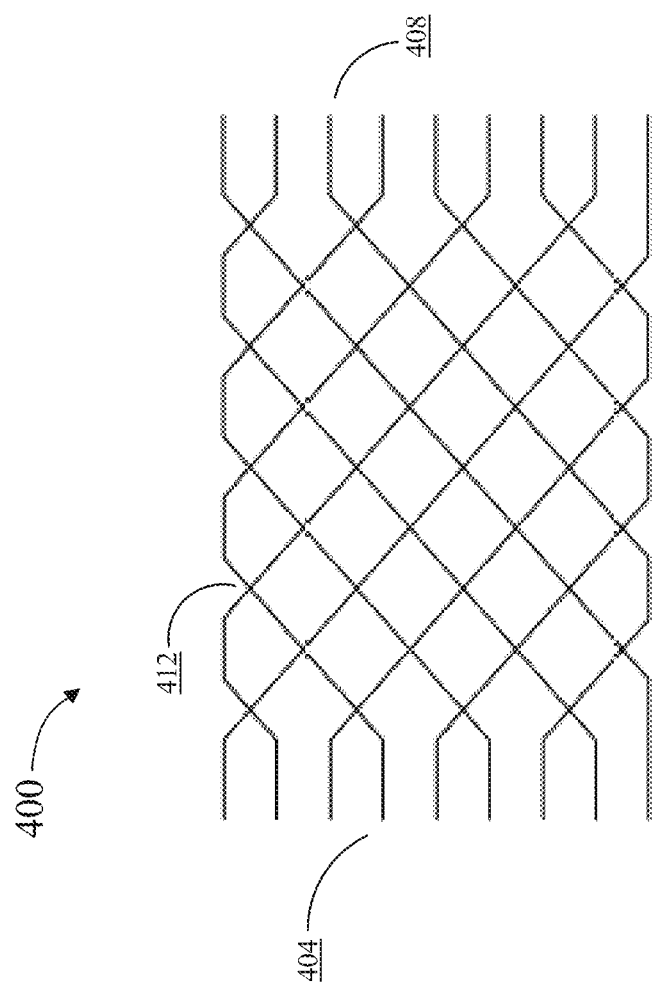
FIG. 4 is a block diagram of an exemplary interferometer mesh.

Referring now to FIG. 4, an exemplary rectangular mesh 400 of MZIs is illustrated. Mesh is shown with 9 inputs 404 and 9 outputs 408. A light beam may propagate along any channel within mesh 400. In some cases, mesh 400 may comprise a photonic integrated circuit. Mesh 400 is shown with 36 intersections 412. In some cases, each intersection 412 may include an MZI, for example as described in reference to FIG. 3 above. In some cases, each intersection 412 may include a beam splitter. Beam splitter may include any type of beam splitter described in this disclosure. In some cases, intersections 412 may include at least a phase shift element. A phase changing element may include any phase shift element described in this disclosure. In some cases, number of intersections 412 be a function of number of inputs 404. For example, in some cases, number of inputs may be represented by variable N and number of intersections 412 within mesh may be equal to N(N−1)/2. In some cases, mesh 400 may perform matrix multiplication according to an arbitrary unitary transformation.

Still referring to FIG. 4, in some embodiments, two meshes 400 and an optical modulator 124 may be used to perform matrix multiplication with any arbitrary matrix according to a singular value decomposition (SVD). SVD allows any arbitrary matrix to be represented by two unitary transformations and a diagonal matrix, for example:

$$M = U\Sigma V^*$$

where M is any arbitrary matrix, U is a first unitary matrix, is a diagonal matrix with real non-negative values along the diagonal, and r is a complex conjugate of a second unitary matrix (which is itself a unitary matrix). In some cases, U and V* may each be implemented by using a first mesh 400 and a second mesh 400, respectively, and may be implemented by using an optical modulator 124 disposed between the first mesh and the second mesh.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Referring again to FIG. 1, in some cases, optical matrix multiplication may be employed for calculation or evaluation of hash functions, for example as may be required for cryptocurrency "mining." For example, in some cases, system 100 may be configured to evaluate a hash (or a hybrid hash function) using digital hashing and optical vector-matrix multiplication. In some cases, a hash function may include a HeavyHash. As used in this disclosure, a "Heavy-Hash" is an iterated composition of an existing has function, such as without limitation SHA256, and a weighting function. In some cases, computing expense associated with a HeavyHash may be mostly related to computation of weighting function. In some cases, weighting function may comprise vector-matrix multiplication and/or matrix multiplication. In some cases, system 100 may evaluate a Heavy-Hash by performing digital hashing using computing device 104 and optical matrix multiplication to compute at least a portion of weighting function. In some cases, weighting function may include one or more unitary matrix transformations. In some cases, system 100 may be configured to evaluate at least a digital signature. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Figure 5:
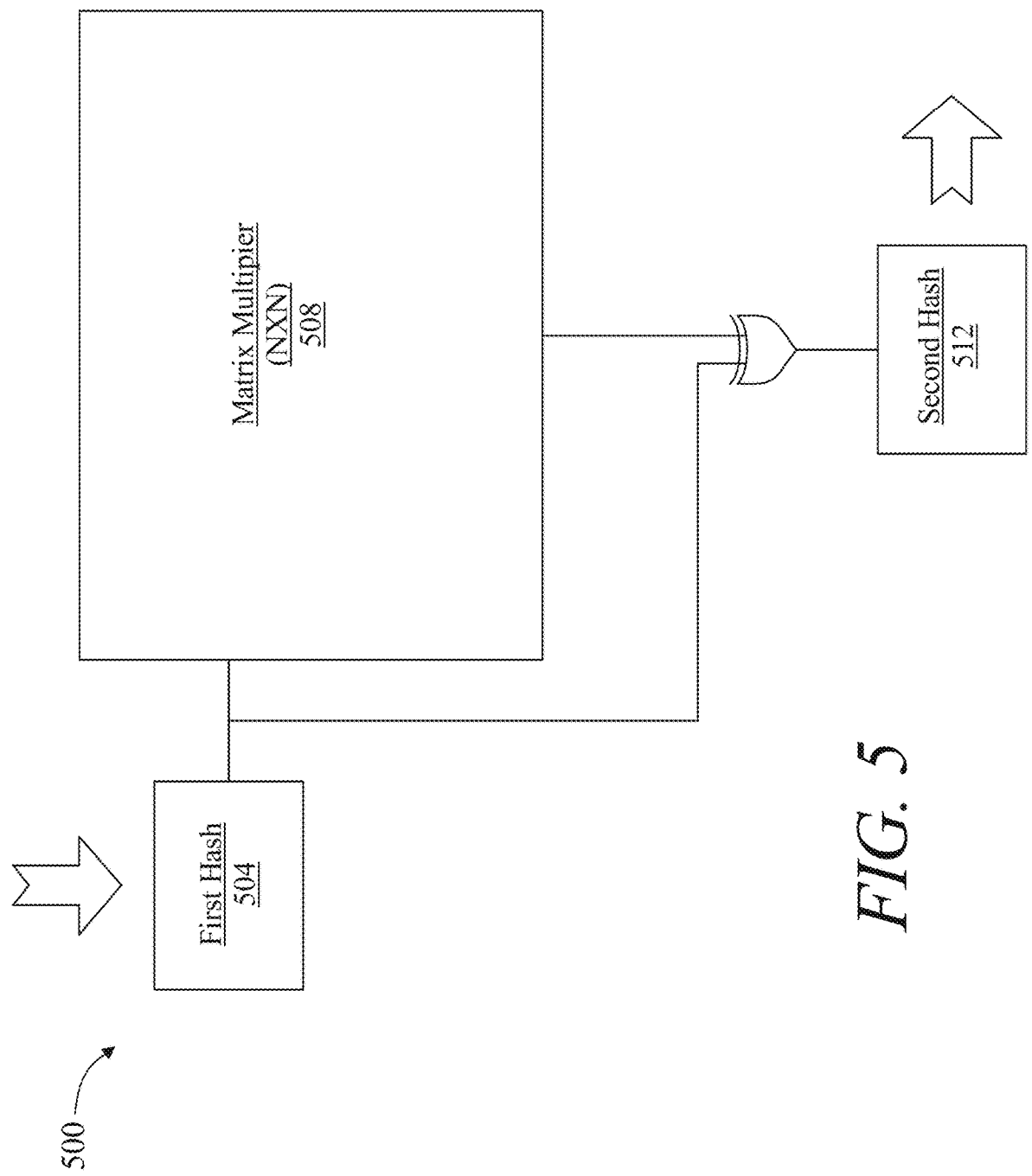
FIG. 5 is a block diagram of a heavy hash circuit.

Referring now to FIG. 5, an exemplary embodiment of a hashing system 500 in which embodiments of matrix multiplication systems and/or methods as described in this disclosure may be used is presented. Hashing system 500 may be configured to perform, without limitation, one or more "heavy hash" algorithms or similar hashing algorithms. In an embodiment, hashing system 500 may include a first hash 504 process, which may be implemented using any hardware or software module and/or program, and may be performed using any form of cryptographic hash as described above, including any SHA hash and/or variant thereof. Output of first hash 504 may be input to a matrix multiplier 508, which may be implemented in any manner that may occur to a person skilled in the art upon reviewing the entirety of this disclosure, including without limitation an optical matrix multiplier as described above. Output from matrix multiplier 508 may be provided to a second hash 512 process, which may be implemented in any manner suitable for implementation of first hash 504. In an embodiment, provision of output from matrix multiplier 508 may be direct; alternatively output of matrix multiplier 508 may be combined from output of first hash 504 using any suitable logic or computational element and/or elements, including without limitation a bitwise XOR of first hash 504 output with matrix multiplier output 508. This process may be performed repeatedly in a "proof of work" or other process that involves repeated hashing.

Referring again to FIG. 1, in some embodiments, system 100 may be configured to evaluate at least an immutable sequence listing, for example without limitation blockchain. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Figure 6:
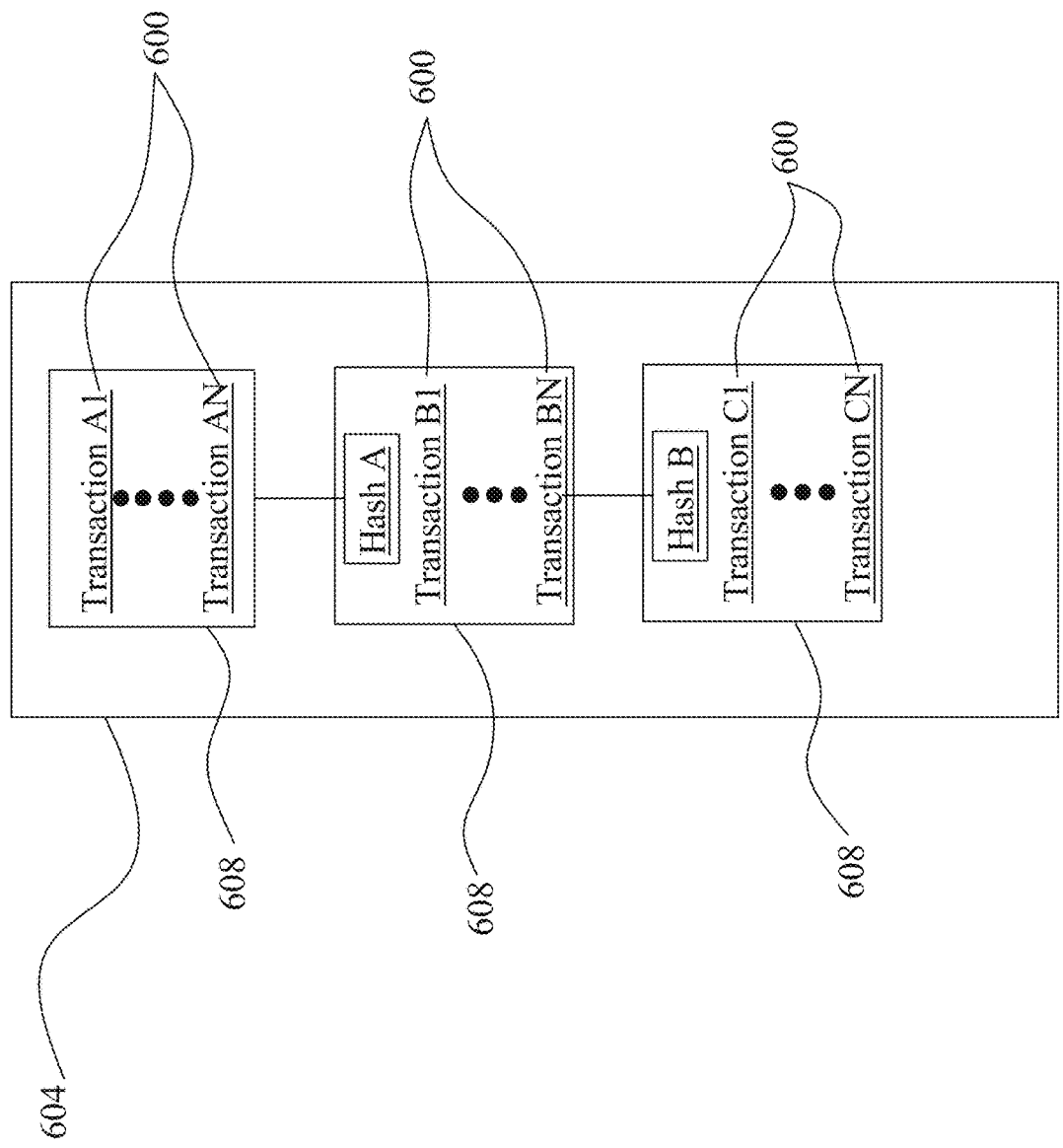
FIG. 6 is a block diagram of an exemplary blockchain.

Referring now to FIG. 6, an exemplary embodiment of an immutable sequential listing 600 such as a blockchain is illustrated. Data elements are listing in immutable sequential listing 600; data elements may include any form of data, including textual data, image data, encrypted data, cryptographically hashed data, and the like. Data elements may include, without limitation, one or more at least a digitally signed assertions. In one embodiment, a digitally signed assertion 604 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 604. In an embodiment, collection of textual data states that the owner of a certain transferable item represented in a digitally signed assertion 604 register is transferring that item to the owner of an address. A digitally signed assertion 604 may be signed by a digital signature created using the private key associated with the owner's public key, as described above.

Still referring to FIG. 6, a digitally signed assertion 604 may describe a transfer of virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 604 may describe the transfer of a physical good; for instance, a digitally signed assertion 604 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 604 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 6, in one embodiment, an address is a textual datum identifying the recipient of virtual currency or another item of value in a digitally signed assertion 604. In some embodiments, address is linked to a public key, the corresponding private key of which is owned by the recipient of a digitally signed assertion 604. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 604 may record a subsequent a digitally signed assertion 604 transferring some or all of the value transferred in the first a digitally signed assertion 604 to a new address in the same manner. A digitally signed assertion 604 may contain textual information that is not a transfer of some item of value in addition to, or as an alternative to, such a transfer. For instance, as described in further detail below, a digitally signed assertion 604 may indicate a confidence level associated with a distributed storage node as described in further detail below.

In an embodiment, and still referring to FIG. 6 immutable sequential listing 600 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 600 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 6, immutable sequential listing 600 may preserve the order in which the at least a posted content took place by listing them in chronological order; alternatively or additionally, immutable sequential listing 600 may organize digitally signed assertions 604 into sub-listings 608 such as "blocks" in a blockchain, which may be themselves collected in a temporally sequential order; digitally signed assertions 604 within a sub-listing 608 may or may not be temporally sequential. The ledger may preserve the order in which at least a posted content took place by listing them in sub-listings 608 and placing the sub-listings 608 in chronological order. The immutable sequential listing 600 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 600 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 6, immutable sequential listing 600, once formed, may be inalterable by any party, no matter what access rights that party possesses. For instance, immutable sequential listing 600 may include a hash chain, in which data is added during a successive hashing process to ensure non-repudiation. Immutable sequential listing 600 may include a block chain. In one embodiment, a block chain is immutable sequential listing 600 that records one or more new at least a posted content in a data item known as a sub-listing 608 or "block." An example of a block chain is the BITCOIN block chain used to record BITCOIN transactions and values. Sub-listings 608 may be created in a way that places the sub-listings 608 in chronological order and link each sub-listing 608 to a previous sub-listing 608 in the chronological order so that any computing device may traverse the sub-listings 608 in reverse chronological order to verify any at least a posted content listed in the block chain. Each new sub-listing 608 may be required to contain a cryptographic hash describing the previous sub-listing 608. In some embodiments, the block chain contains a single first sub-listing 608 sometimes known as a "genesis block."

Still referring to FIG. 6, the creation of a new sub-listing 608 may be computationally expensive; for instance, the creation of a new sub-listing 608 may be designed by a "proof of work" protocol accepted by all participants in forming the immutable sequential listing 600 to take a powerful set of computing devices a certain period of time to produce. Where one sub-listing 608 takes less time for a given set of computing devices to produce the sub-listing 608 protocol may adjust the algorithm to produce the next sub-listing 608 so that it will require more steps; where one sub-listing 608 takes more time for a given set of computing devices to produce the sub-listing 608 protocol may adjust the algorithm to produce the next sub-listing 608 so that it will require fewer steps. As an example, protocol may require a new sub-listing 608 to contain a cryptographic hash describing its contents; the cryptographic hash may be required to satisfy a mathematical condition, achieved by having the sub-listing 608 contain a number, called a nonce, whose value is determined after the fact by the discovery of the hash that satisfies the mathematical condition. Continuing the example, the protocol may be able to adjust the mathematical condition so that the discovery of the hash describing a sub-listing 608 and satisfying the mathematical condition requires more or less steps, depending on the outcome of the previous hashing attempt. Mathematical condition, as an example, might be that the hash contains a certain number of leading, trailing, and/or overall zeros and a hashing algorithm that requires more steps to find a hash containing a greater number of leading, trailing, and/or overall zeros, and fewer steps to find a hash containing a lesser number of leading, trailing, and/or overall zeros. In some embodiments, production of a new sub-listing 608 according to the protocol is known as "mining." The creation of a new sub-listing 608 may be designed by a "proof of stake" protocol as will be apparent to those skilled in the art upon reviewing the entirety of this disclosure.

Continuing to refer to FIG. 6, in some embodiments, protocol also creates an incentive to mine new sub-listings 608. The incentive may be financial; for instance, successfully mining a new sub-listing 608 may result in the person or entity that mines the sub-listing 608 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 608 Each sub-listing 608 created in immutable sequential listing 600 may contain a record or at least a posted content describing one or more addresses that receive an incentive, such as virtual currency, as the result of successfully mining the sub-listing 608.

With continued reference to FIG. 6, where two entities simultaneously create new sub-listings 608, immutable sequential listing 600 may develop a fork; protocol may determine which of the two alternate branches in the fork is the valid new portion of the immutable sequential listing 600 by evaluating, after a certain amount of time has passed, which branch is longer. "Length" may be measured according to the number of sub-listings 608 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 608 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 600 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 600.

Still referring to FIG. 6, additional data linked to at least a posted content may be incorporated in sub-listings 608 in the immutable sequential listing 600; for instance, data may be incorporated in one or more fields recognized by block chain protocols that permit a person or computer forming a at least a posted content to insert additional data in the immutable sequential listing 600. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 6, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 608 in a block chain computationally challenging; the incentive for producing sub-listings 608 may include the grant of new crypto currency to the miners. Quantities of crypto currency may be exchanged using at least a posted content as described above.

Figure 7:
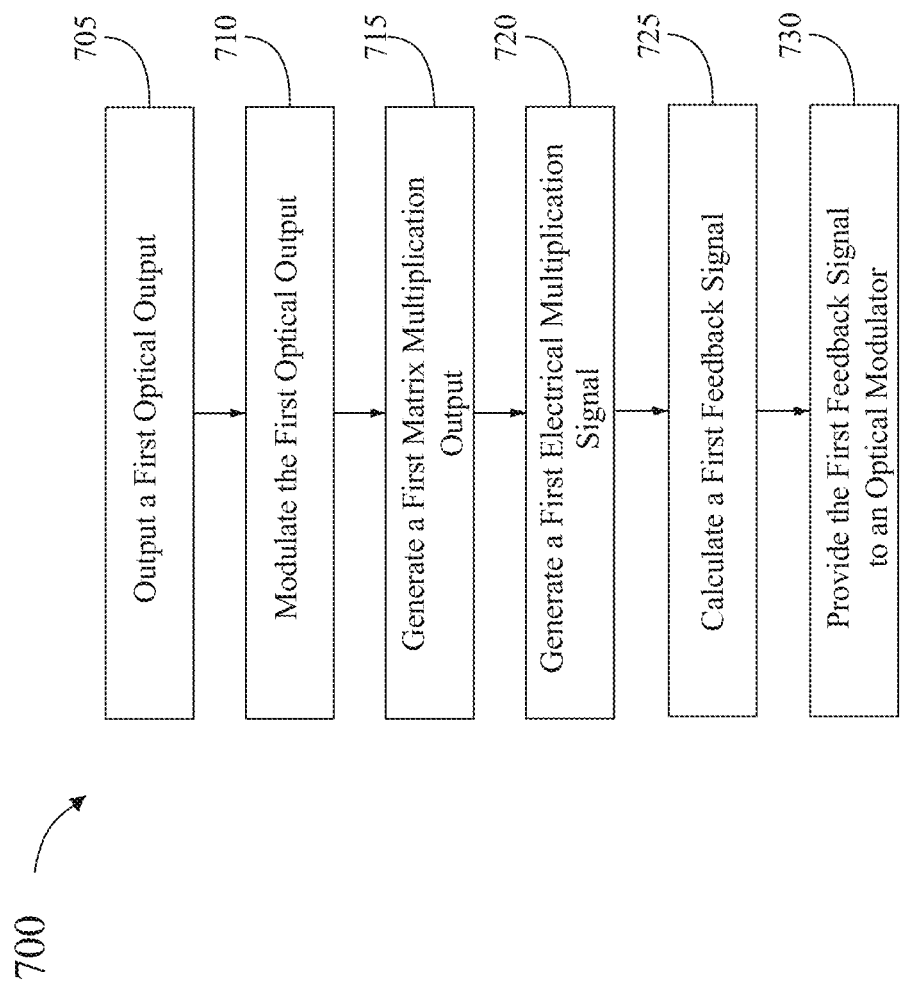
FIG. 7 is a flow diagram of an exemplary method of optical matrix calculation.

Referring now to FIG. 7, an exemplary method 700 of optical matrix calculation is illustrated by way of a flow chart. At step 705, at least a first light source outputs at least a first optical output. In some cases, first optical output has a first wavelength. first light source may include any light source described in this disclosure, including with reference to FIGS. 1-5. first optical output may include any light described in this disclosure, including with reference to FIGS. 1-5. First wavelength may include any wavelength described in this disclosure, including with reference to FIGS. 1-5. At least a second light source may output at least a second optical output. In some cases, second optical output has a second wavelength that is substantially different from first wavelength. second light source may include any light source described in this disclosure, including with reference to FIGS. 1-5. Second optical output may include any light described in this disclosure, including with reference to FIGS. 1-5. Second wavelength may include any wavelength described in this disclosure, including with reference to FIGS. 1-5.

Still referring to FIG. 7, at step 710, at least an optical modulator accepts and modulates at least a first optical output. At least an optical modulator may be located down beam from at least a first light source. Optical modulator may include any optical modulator described in this disclosure, including with reference to FIGS. 1-5. In some cases, at least a beam splitter may be located between at least a first light source and at least an optical modulator. At least a beam splitter may be configured to split one or more of at least a first optical output and at least a second optical output into a plurality of light beams. In some cases, method 700 may additionally include accepting and modulating, using at least an optical modulator, at least a second optical output.

Still referring to FIG. 7, at step 715, at least an optical matrix multiplier performs a first matrix multiplication as a function of the first optical output; at least an optical matrix multiplier may perform a second matrix multiplication as a function of the second optical output. Optical matrix multiplier may include any optical matrix multiplier described in this disclosure, including with reference to FIGS. 1-5. In some cases, at least an optical matrix multiplier may be located down beam from at least an optical modulator; and the at least an optical matrix multiplier accepts at least a first optical output, for example after the at least a first optical output has passed through the at least an optical modulator. In some cases, at least an optical matrix multiplier may include a plurality of Mach-Zehnder Interferometers (MZIs) arranged in a mesh.

Still referring to FIG. 7, at step 720, at least a photodetector measures at least a first optical output; at least a photodetector may measure at least a second optical output. In some cases, at least a photodetector may be located down beam from at least an optical matrix multiplier and the at least a photodetector may measure at least a first optical output and/or at least a second optical output after having been passed through the at least an optical matrix multiplier. Photodetector may include any photodetector described in this disclosure, including with reference to FIGS. 1-5.

Still referring to FIG. 7, at step 725, an asynchronous feedback circuit generates a feedback signal based on output of at least an optical matrix multiplier. This may be implemented without limitation as described above in reference to FIGS. 1-5.

Further referring to FIG. 7, at step 730, feedback generator may provide feedback signal to optical modulator. This may be implemented without limitation as described above in reference to FIGS. 1-5.

With continued reference to FIG. 7, in some embodiments method 700 may additionally include controlling, using an analog circuit, at least one of at least an optical modulator and at least an optical matrix multiplier as a function of at least a photodetector. In some embodiments, analog circuit may be in communication with at least a photodetector and at least one of at least an optical modulator and at least an optical matrix multiplier. Analog circuit may include any analog circuit described in this disclosure, including with reference to FIGS. 1-5. In some cases, method 700 may additionally include digitizing, using an analog to digital converter, one or more of an input value from at least a photodetector and an output value used to control at least one of at least an optical modulator and at least an optical matrix multiplier. Analog to digital converter may include any analog to digital converter described in this disclosure, including with reference to FIGS. 1-5. In some cases, method 700 may additionally include performing, using analog circuit, a specific function based upon at least a photodetector.

Still referring to FIG. 7, a computing device 104 or other element may perform discrete time signal processing on one or more signals derived from analog-to-digital converter or other elements of system 100. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 7, in some embodiments, method 700 may additionally include substantially combining, using a wavelength multiplexor, at least a first optical output and at least a second optical output. In some cases, wavelength multiplexor may be disposed down beam from at least a first light source and at least a second light source and up beam from at least an optical modulator. In some embodiments, method 700 may additionally include separating, using a wavelength demultiplexor, at least a first optical output and at least a second optical output. In some cases, wavelength demultiplexor may be disposed down beam from the optical matrix multiplier and up beam from the at least a photodetector.

With continued reference to FIG. 7, in some embodiments, method 700 may additionally include evaluating, using at least an optical matrix multiplier and a computing device communicative with the at least an optical modulator, at least an optical matrix multiplier, and at least a photodetector, a hash function. In some cases, hash function includes a weight function.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
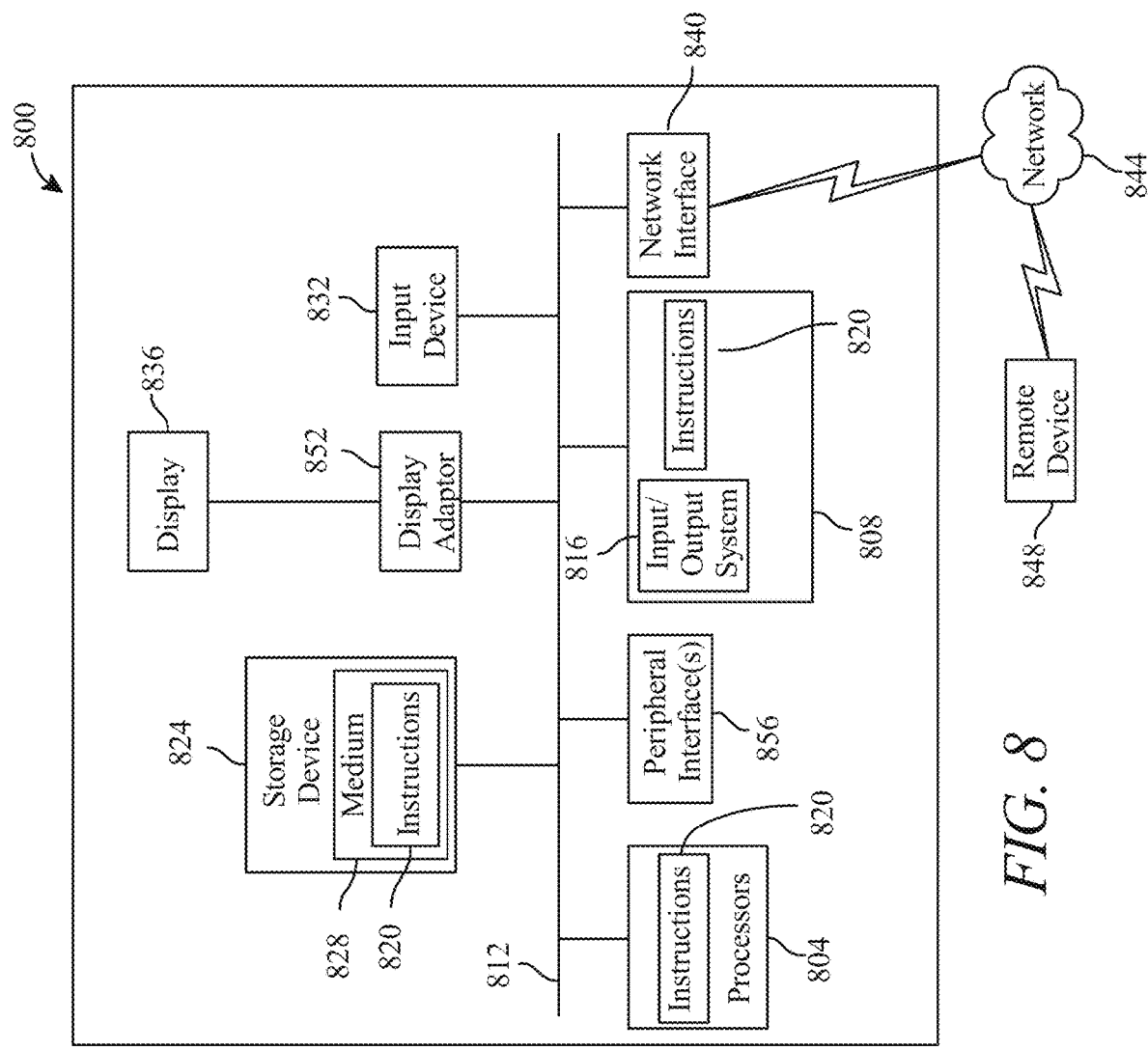
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for optical calculation with asynchronous feedback, the system comprising:
    at least a first light source configured to output at least a first optical output having a first wavelength;
    at least an optical modulator located down beam from the at least a first light source and configured to modulate the at least a first optical output, wherein the at least an optical modulator is further configured to modulate a light pulse characteristic of the at least a first optical output, wherein the light pulse characteristic comprises one or more of a pulsed duration, repetition rate, and duty cycle;
    at least an optical matrix multiplier located down beam from the at least an optical modulator configured to:
        accept the at least a first optical output; and
        generate a first matrix multiplication output as a function of the at least a first optical output;
    at least a first photodetector located down beam from the at least an optical matrix multiplier configured to:
        measure the first matrix multiplication output; and
        generate a first electrical multiplication output signal as a function of the first matrix multiplication output;
    an asynchronous feedback circuit electrically connected to the at least a first photodetector and at least one of the at least an optical modulator and the at least an optical matrix multiplier, wherein the asynchronous feedback circuit is configured to:
        calculate a first feedback signal as a function of the first electrical multiplication output signal; and
        provide the first feedback signal to the at least one of the at least an optical modulator and the at least an optical matrix multiplier; and a computing device communicative with the at least an optical matrix multiplier, wherein the computing device is configured to evaluate, using the at least an optical matrix multiplier, a hash function comprising an iterated composition of a security hash algorithm and a weighting function.

2. The system of claim 1 wherein the asynchronous feedback circuit further comprises an analog circuit in communication with the at least a first photodetector and the at least one of the at least an optical modulator and the at least an optical matrix multiplier.

3. The system of claim 1, wherein the asynchronous feedback circuit is configured to calculate the first feedback signal as a non-linear function of the first electrical multiplication output signal.

4. The system of claim 1, wherein the at least an optical matrix multiplier comprises a plurality of Mach-Zehnder Interferometers (MZIs) arranged in a mesh.

5. The system of claim 1 further comprising at least a second light source configured to output at least a second optical output having a second wavelength substantially different from the first wavelength, wherein:
the at least an optical modulator is configured to modulate the at least a second optical output; and
the at least an optical matrix multiplier is configured to generate a second matrix multiplication output as a function of the at least a second optical output.

6. The system of claim 5 further comprising at least a second photodetector located down beam from the at least an optical matrix multiplier and configured to:
measure the second matrix multiplication output; and
generate a second electrical multiplication output signal as a function of the second matrix multiplication output.

7. The system of claim 5 further comprising a wavelength multiplexor disposed down beam from the at least a first light source and the at least a second light source and up beam from the at least an optical modulator, wherein the wavelength multiplexor is configured to substantially combine the at least a first optical output and the at least a second optical output.

8. The system of claim 1 further comprising a beam splitter configured to split at least a beam from the at least a first light source into two or more beams, wherein the beam splitter comprises an evanescent wave coupler.

9. A method of optical calculation with asynchronous feedback, the method comprising:
outputting, using at least a first light source, at least a first optical output having a first wavelength;
modulating, using at least an optical modulator located down beam from the at least a first light source, the at least a first optical output, wherein the at least an optical modulator is further configured to modulate a light pulse characteristic of the at least a first optical output, wherein the light pulse characteristic comprises one or more of a pulsed duration, repetition rate, and duty cycle;
generating, using at least an optical matrix multiplier located down beam from the at least an optical modulator, a first matrix multiplication output as a function of the at least a first optical output;
generating, using at least a first photodetector located down beam from the at least an optical matrix multiplier, a first electrical multiplication output signal as a function of the first matrix multiplication output;
calculating, by an asynchronous feedback circuit electrically connected to the at least a first photodetector and at least one of the at least an optical modulator and the at least an optical matrix multiplier, a first feedback signal as a function of the first electrical multiplication output signal;
providing, by the asynchronous feedback circuit, the first feedback signal to the at least one of the at least an optical modulator and the at least an optical matrix multiplier; and
evaluating, by a computing device communicative with the at least an optical matrix multiplier, using the at least an optical matrix multiplier, a hash function comprising an iterated composition of a security hash algorithm and a weighting function.

10. The method of claim 9 wherein the asynchronous feedback circuit further comprises an analog circuit in communication with the at least a first photodetector and the at least one of the at least an optical modulator and the at least an optical matrix multiplier.

11. The method of claim 9 further comprising calculating, by the asynchronous feedback circuit, the first feedback signal as a non-linear function of the first electrical multiplication output signal.

12. The method of claim 9, wherein the at least an optical matrix multiplier comprises a plurality of Mach-Zehnder Interferometers (MZIs) arranged in a mesh.

13. The method of claim 9 further comprising:
outputting, using at least a second light source, at least a second optical output having a second wavelength substantially different from the first wavelength;
modulating, using the at least an optical modulator, the at least a second optical output; and
generating, by the at least an optical matrix multiplier, a second matrix multiplication output as a function of the at least a second optical output.

14. The method of claim 13 further comprising generating, by at least a second photodetector located down beam from the at least an optical matrix multiplier, a second electrical multiplication output signal as a function of the second matrix multiplication output.

15. The method of claim 13 further comprising a wavelength multiplexor disposed down beam from the at least a first light source and the at least a second light source and up beam from the at least an optical modulator, wherein the wavelength multiplexor is configured to substantially combine the at least a first optical output and the at least a second optical output.

16. The method of claim 9 further comprising splitting, using a beam splitter, at least a beam from the at least a first light source into two or more beams, wherein the beam splitter comprises an evanescent wave coupler.

* * * * *